Figure 15:
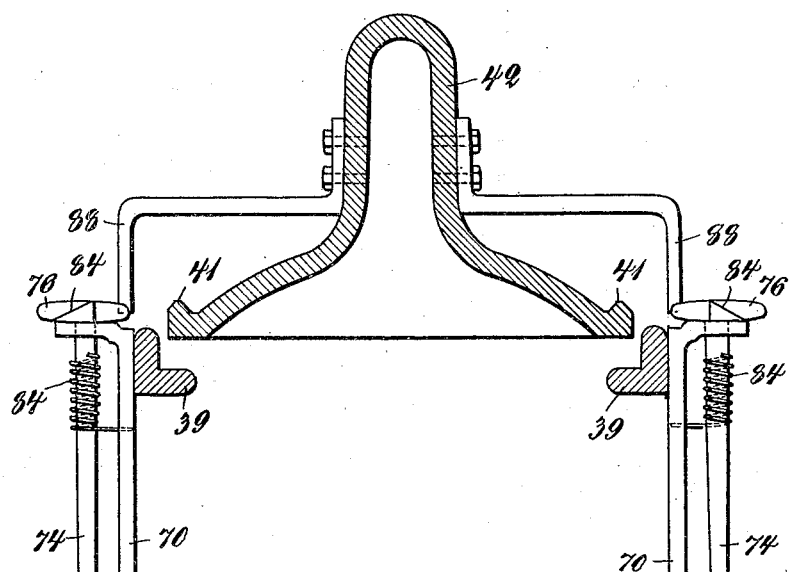

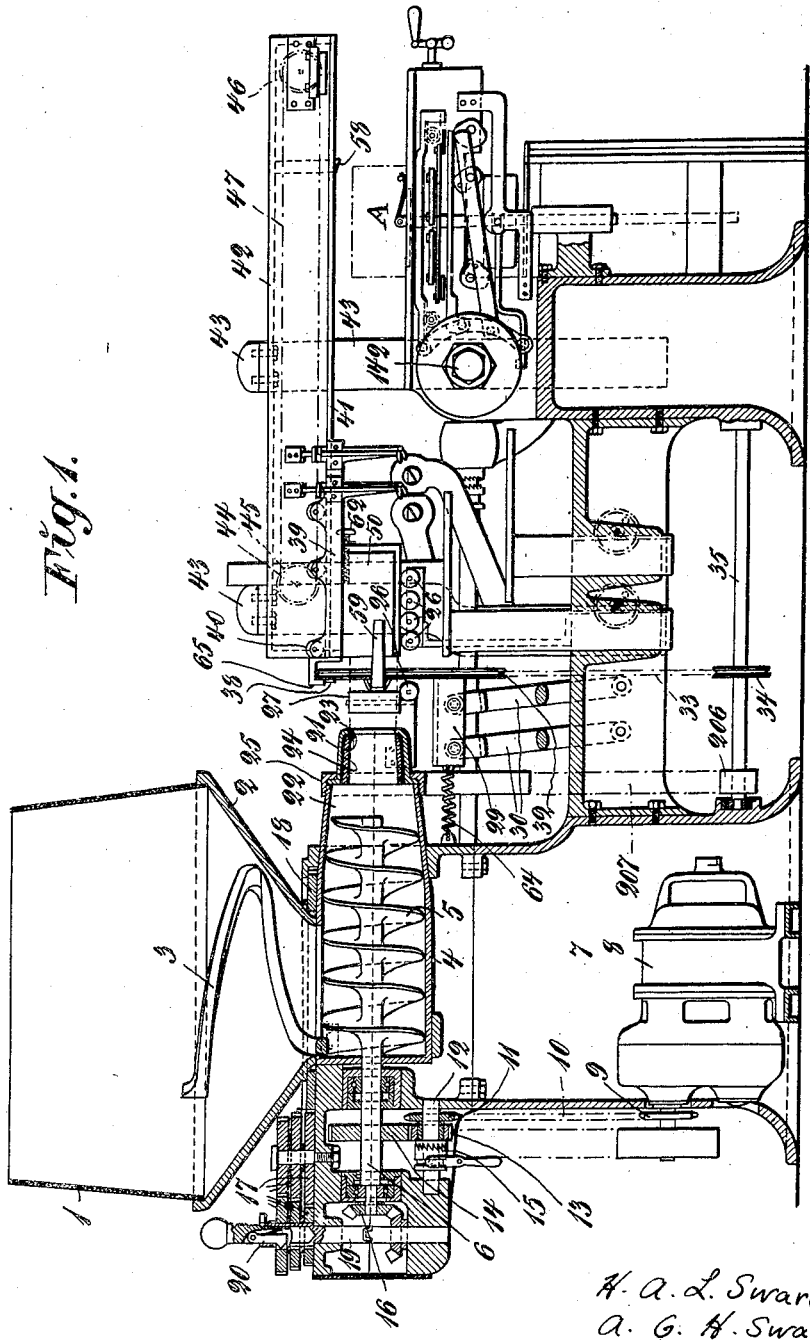

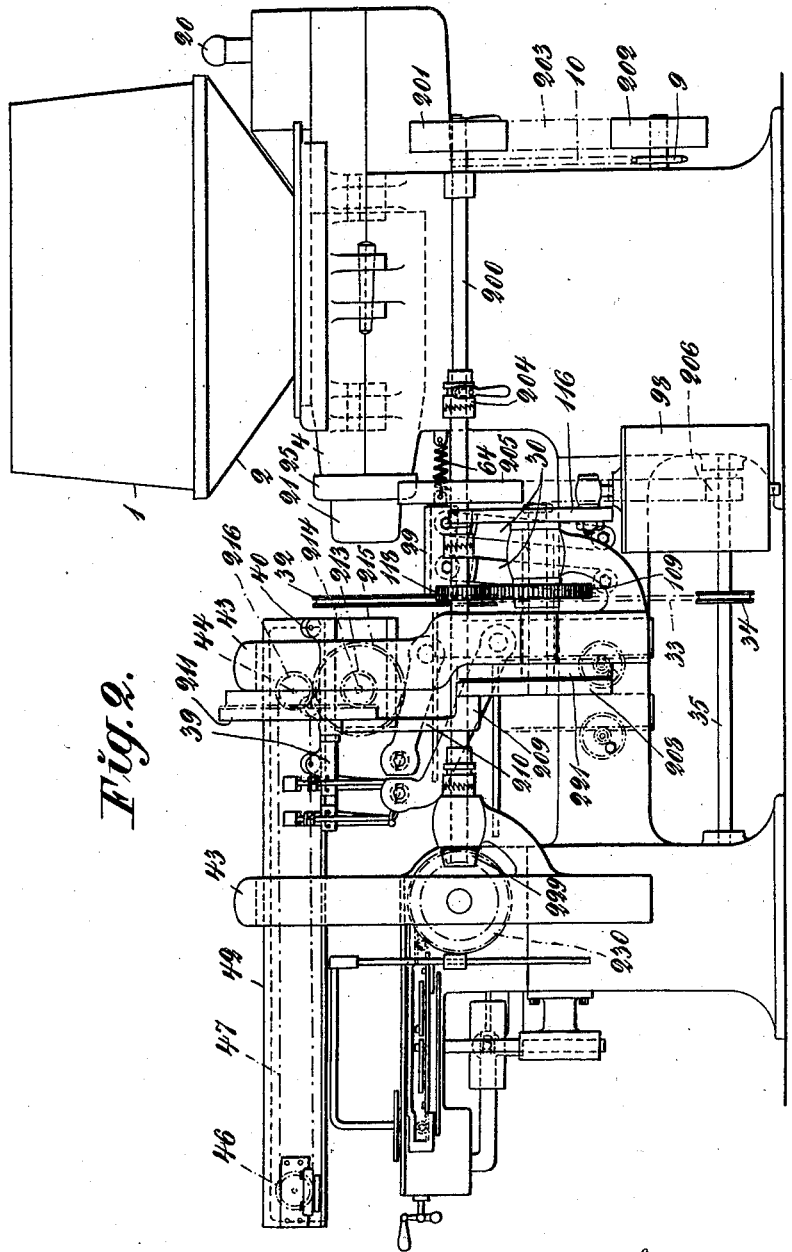

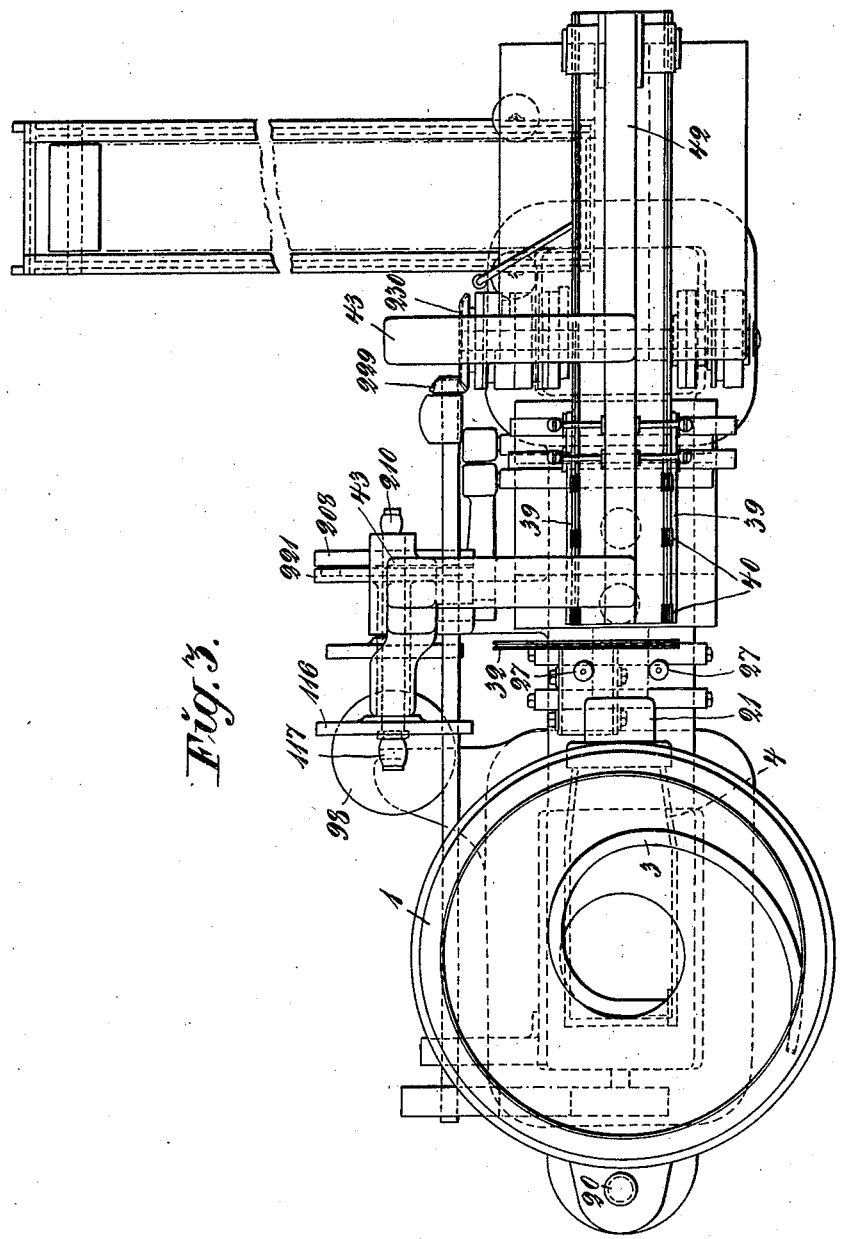

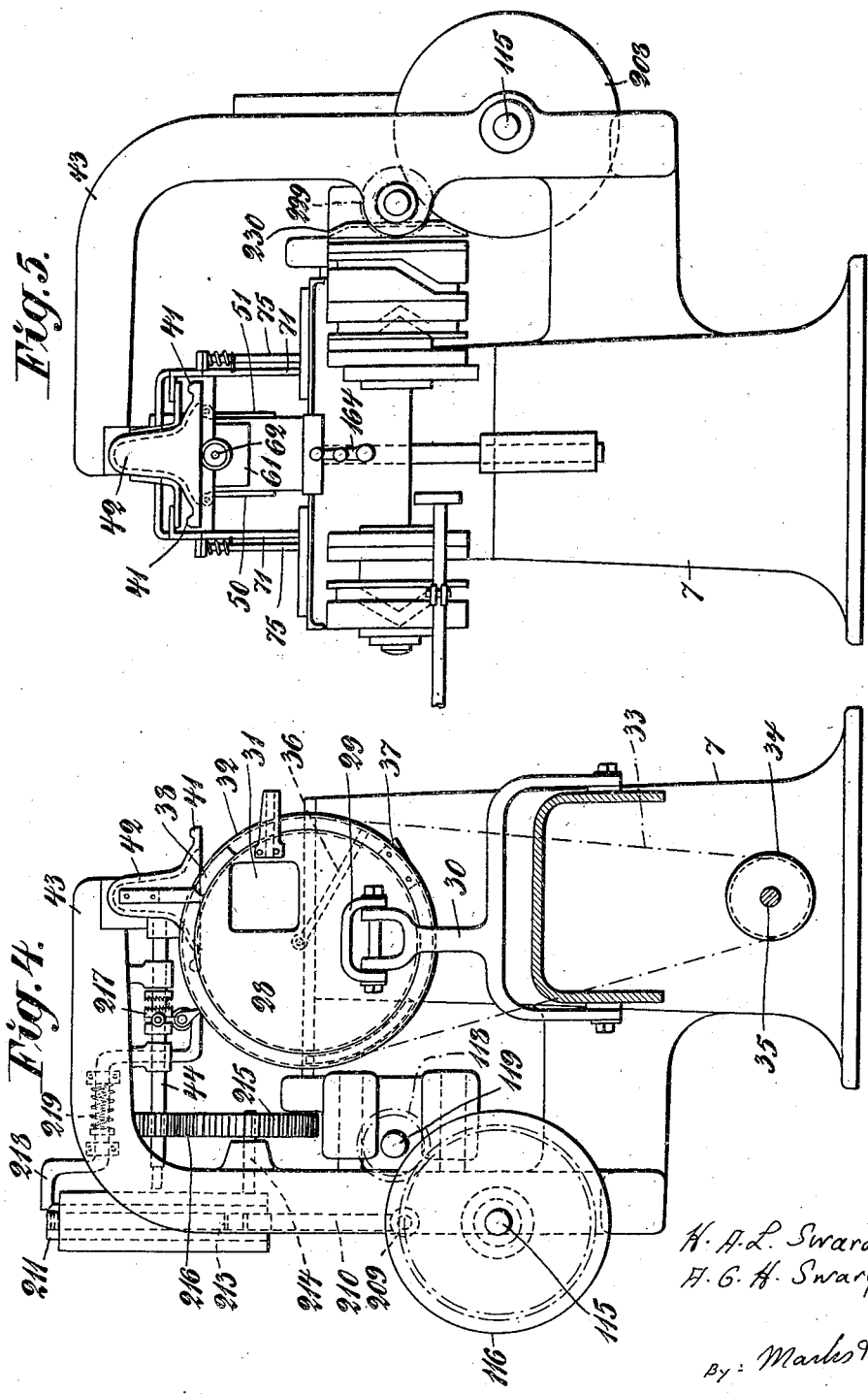

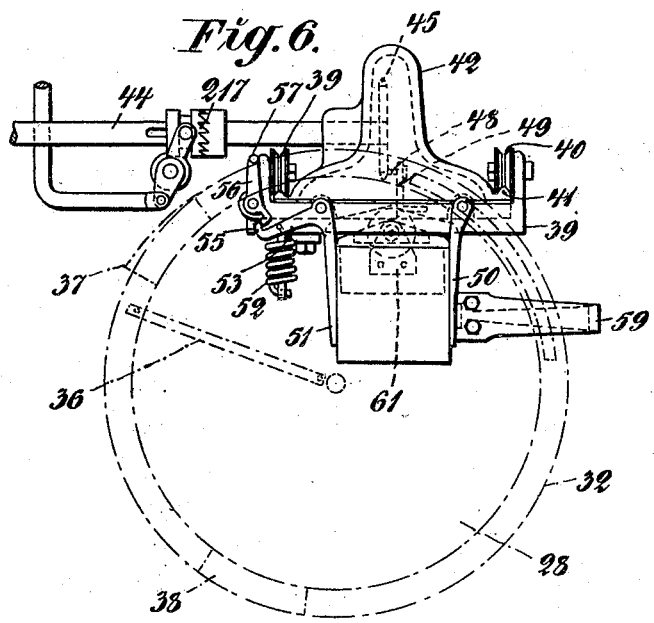
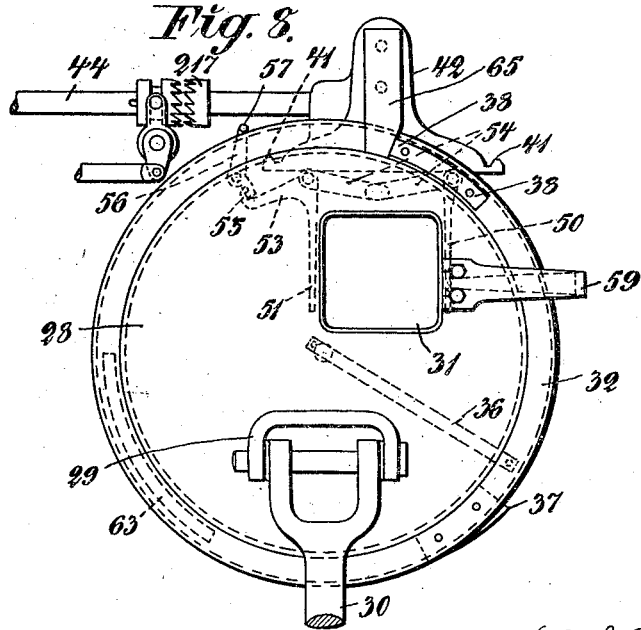

July 14, 1931. H. A. L. SWÄRD ET AL 1,814,496
MACHINE FOR AUTOMATICALLY FORMING AND DIVIDING PLASTIC MASSES
Filed Oct. 24, 1927 10 Sheets-Sheet 6
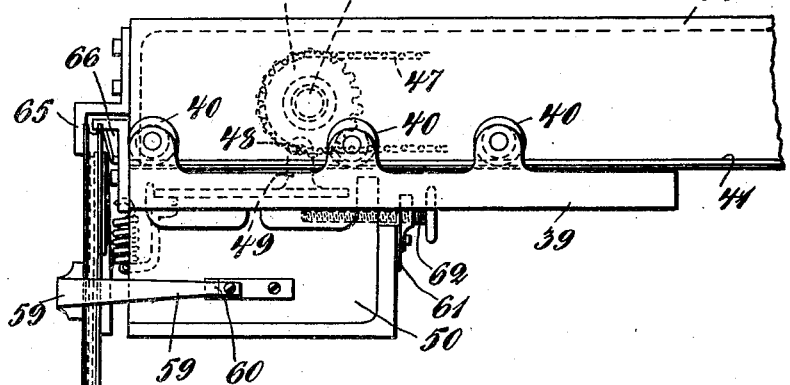
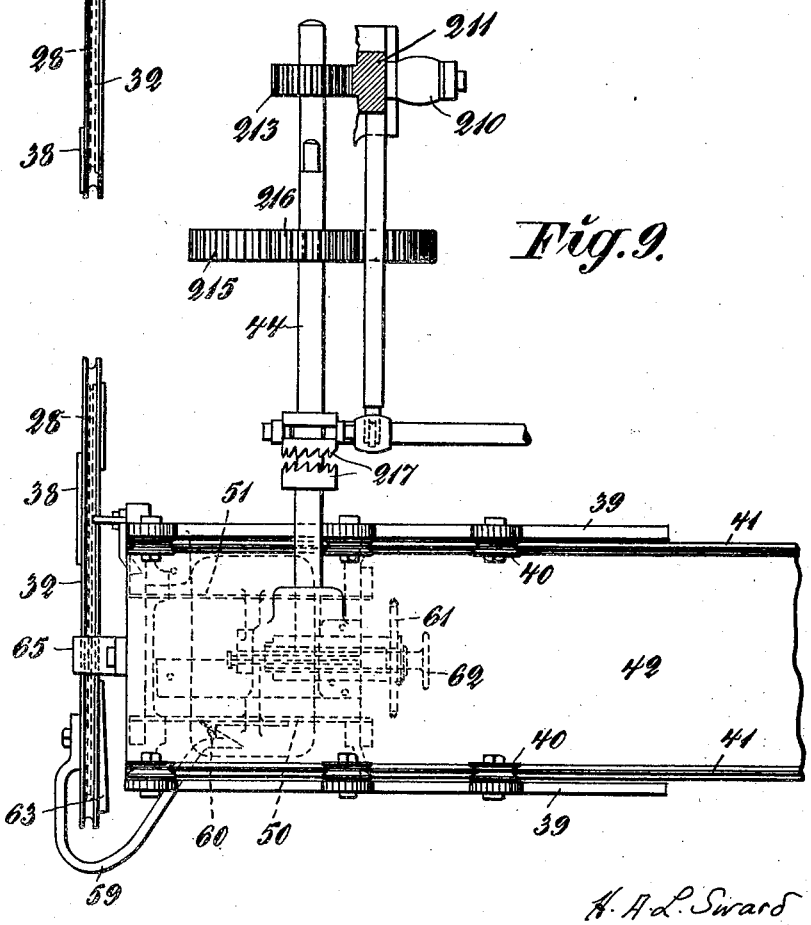
H. A. L. Sward &
A. G. H. Sward INVENTORS
By: Marks & Clerk Attys.

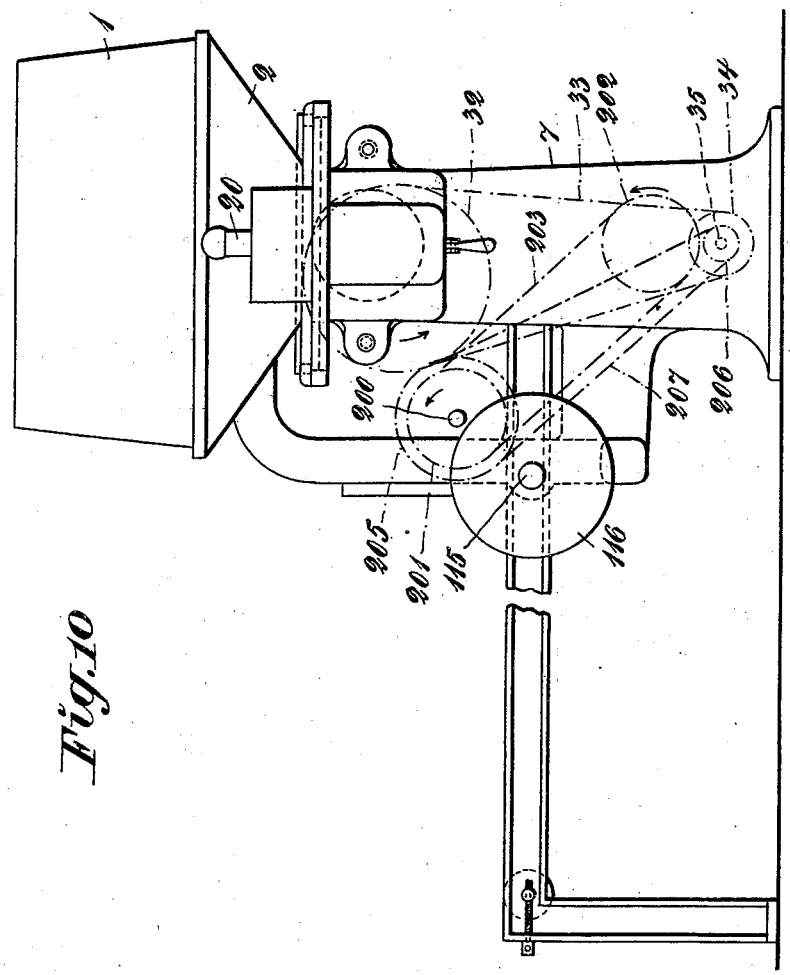

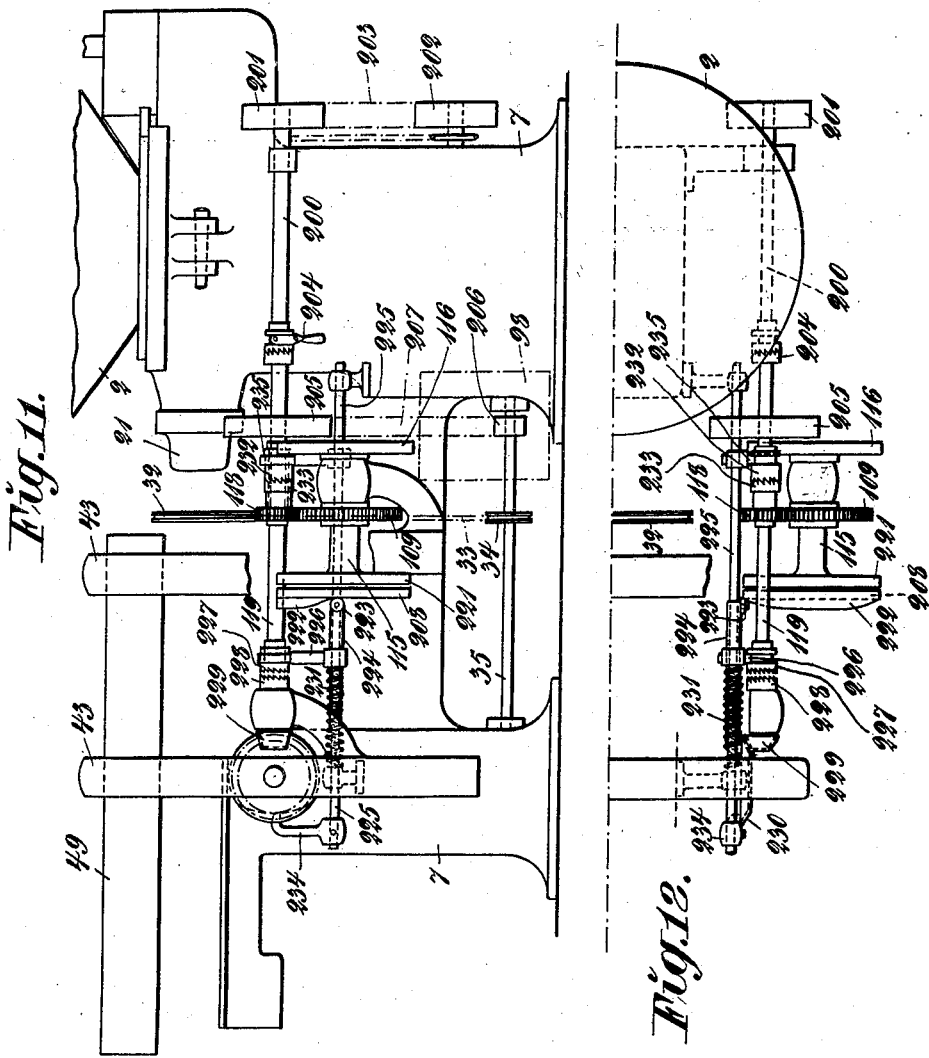

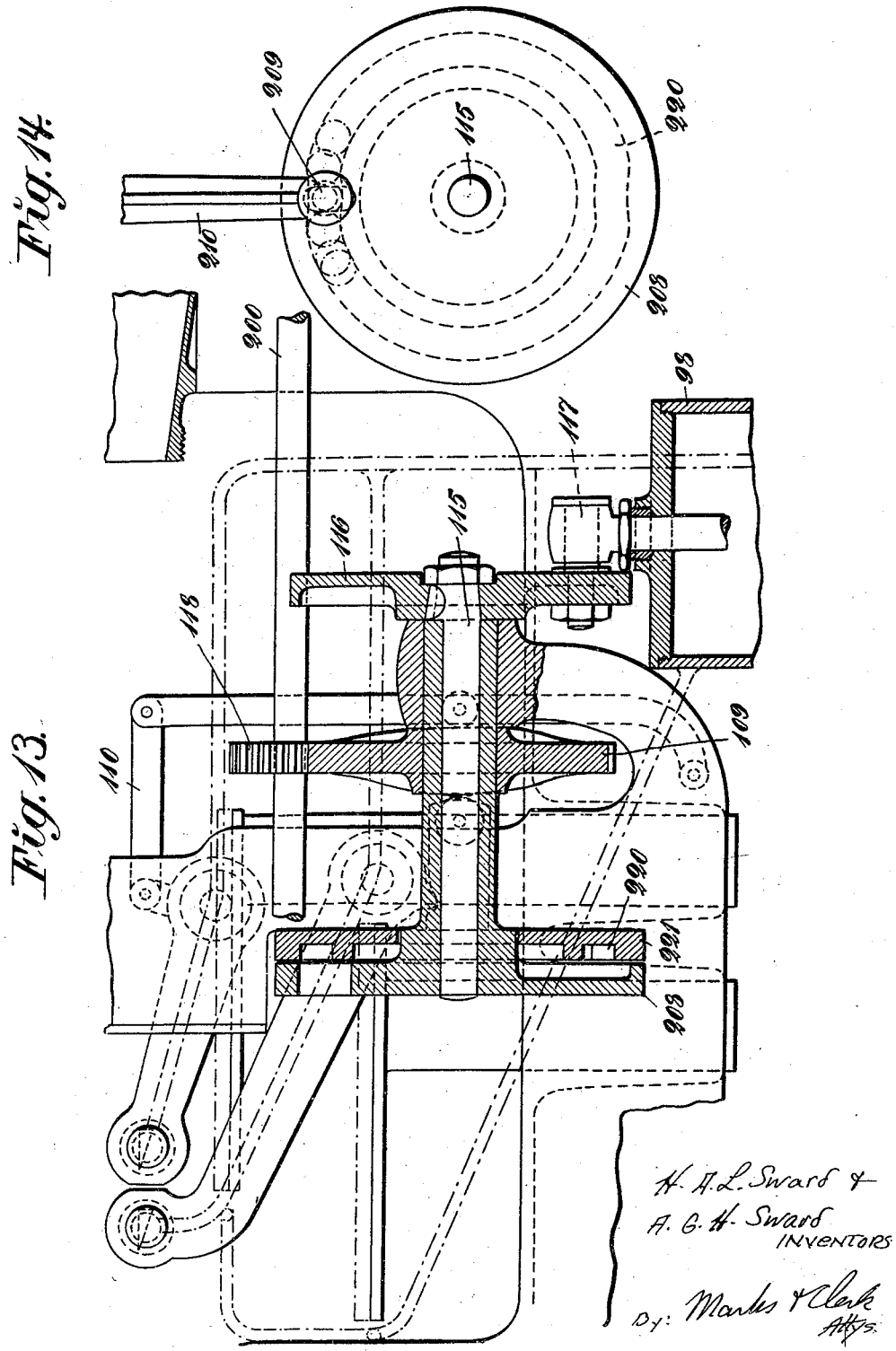

Patented July 14, 1931

1,814,496

UNITED STATES PATENT OFFICE

HERBERT AUGUST LEONARD SWÄRD AND ANTON GUSTAF HILDORIUS SWÄRD, OF NASSJO, SWEDEN, ASSIGNORS TO SVENSKA JASTFABRIKS AKTIEBOLAGET, OF STOCKHOLM, SWEDEN

MACHINE FOR AUTOMATICALLY FORMING AND DIVIDING PLASTIC MASSES

Application filed October 24, 1927, Serial No. 228,435, and in Sweden October 30, 1926.

The present invention relates to a machine for forming and dividing wrapping plastic masses or bodies. The invention has for its object to provide a machine of the said kind, which operates in a reliable and efficient manner, while permitting a high speed of production.

In hitherto known machines of this kind certain difficulties are encountered, particularly in regard to the forming, dividing and wrapping of the masses, and it is the object of the present invention to obviate these difficulties.

With respect to the forming, which preferably is effected by forcing the mass out through a nozzle in the form of a continuous rod, it is of importance that the machine produces an entirely homogeneous rod, which is attained by the use of feeding means constructed in a special manner. Moreover, it is necessary that the walls of the nozzle be formed in such a manner that the outer sides of the rod will be entirely even and smooth. Finally, it has been found to be suitable to cause the rod to expand freely when leaving the nozzle, and to effect the dividing only at so great a distance from the nozzle that the expansion has practically ceased. Thus it is avoided that the surface of the cut will be curved.

As to the division, which preferably is effected by cutting the rod by means of a steel-wire or a steel-band, the cutting member is arranged, according to the invention, so as to take part in the continuous movement of the blank rod during the period of time in which the cutting takes place, it being thus attained that the surface of the cut will always be at right angles to the longitudinal direction of the rod which, on the other hand, would obviously not be the case if the cutting member were stationary.

Finally, the machine is provided with suitable driving and transmission means, so that the movements of the different parts and mechanisms will be in a certain predetermined relation to each other. These means as well as a number of details in the construction are disclosed more fully in connection with the following description of a form of embodiment of the machine in question as represented in the accompanying drawings.

Fig. 1 is a partly sectioned elevation of the machine. Fig. 2 is an elevation opposite to that shown in Fig. 1. Fig. 3 is a plan view of the machine. Fig. 4 is a cross section of the machine, and Fig 5 an endwise view of the same. Fig. 6 is an endwise view, and Fig. 7 an elevation of the dividing means and of parts cooperating therewith, such as the cutting member, gripping plates and a conveyer carriage. Fig. 8 shows the same as Fig. 6, with the difference, however, that certain parts occupy other positions. Fig. 9 is a plan view of the device disclosed in Fig. 7.

Figure 16:
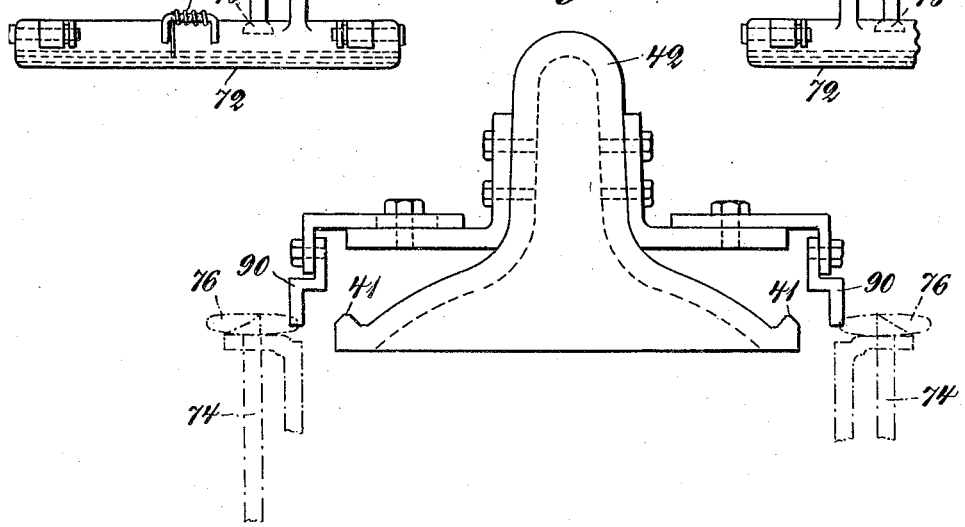

Fig. 10 is an elevational view of the machine showing the belt drive from the motor in dotted lines, Fig. 11 is an elevational view showing drive gearing, Fig. 12 is a top plan of the arrangement shown in Fig. 11, Fig. 13 is an enlarged elevational detail partly in section showing driving means for operating the carriage, Fig. 14 is an elevational detail of one of the parts shown in Fig. 13, and Figs. 15 and 16 are respectively sectional and elevational views of the carriage supporting means.

In order to render the drawings less complicated, certain details have been indicated therein only diagrammatically, while other details included in some of the figures have been omitted from others.

The machine comprises two main parts, i. e. the forming device, and the dividing means. Cooperating with these main parts, there are other means, however, such as feeding means, and so forth, which will be described under special headings together with the main parts.

The feeding means

In dealing with plastic masses, which frequently are more or less adhesive, comparatively great difficulties are met with in regard to the continuous and homogeneous feeding of the mass from the filling container. To obviate these disadvantages, the machine according to the present invention is provided with a cylindrical or upwardly slightly tapering container 1 (Figs. 1–3), fitting at the bottom to a conical funnel 2 having a knife 3 or the like provided therein, which knife is shaped on the line of a helix. The funnel 2 opens into a drum 4 having a conveying worm 5 provided therein. A rotary movement is imparted to the conveying worm and preferably also to the funnel, whereas the knife 3 is in such a case stationary, the lower portion of the same being attached to the drum 4. The shaft 6 of the conveying worm is suitably journalled in the machine frame 7, which has an electric motor 8 incorporated therein, said motor driving all of the active members of the machine. Attached to the motor shaft is a sprocket wheel 9 adapted to drive a sprocket wheel 11 through the medium of a chain 10, said sprocket wheel 11 being arranged on a shaft 12 journalled in the machine frame, which latter shaft also has a pinion 13 secured thereon, said pinion engaging a toothed wheel 14 rigidly attached to the shaft 6 of the conveying worm. In this manner, rotary motion from the motor is imparted to the conveying worm 5 which, in turn, transmits rotary movement to the container 1 and to the funnel 2 through the medium of toothed gearings. A clutch-coupling 15 provided on the shaft 12 facilitates engagement and disengagement of the conveying worm. The toothed gearings mediating transmission of the movements to the container 1 and to the funnel 2 comprise a bevel gearing 16 and a number of spur gearings 17, which latter are in engagement with a toothed wheel 18 attached to the funnel 2, which is rotatably journalled in the machine frame 7 in any suitable manner. Transmission of the movement between the bevel gearing 16 and the spur gear systems 17 is mediated by a shaft 19 having a coupling device 20 combined therewith, said coupling device facilitating alteration of the ratio of gear, so that the speed of rotation of the funnel 2 may be varied within certain limits with respect to the speed of rotation of the conveying worm. The coupling device 20 and the gear systems 17 are of a type known per se, a detailed description of these parts being thus rendered superfluous.

The principle of the feeding consists in this that the mass, which is filled into the container 1 in any suitable manner, shall slide downwards under the influence of its own weight, but where such downward sliding does not take place, or is considerably retarded, for instance by the adhesiveness of the mass and the restricted passage of the funnel, the mass must be kept in continuous movement, so that the same will not stick to the walls of the vessel and is also given a downward movement adapted to the requirements of discharge, through the action of the helical knife 3. The velocity of discharge is obviously in a certain measure dependent on the filling conditions, and it is with respect to these that the speed of rotation of the container can be varied by an alteration of the ratio of gear of the gear systems 17, when the coupling member 20 is shifted. Owing to the differences in the physical properties of the mass, such as moisture, temperature, adhesiveness and so forth, it is also necessary that the speed of rotation can be altered to such an extent that the velocity of discharge will be substantially constant.

Instead of causing the container or the lower portion thereof to rotate, it is obviously possible to provide a rotating knife, while the container is stationary.

From the container 1, the mass enters the drum 4, where the same is forced forwards by the conveying worm 5. The speeds of rotation of the conveying worm and that of the funnel are in a certain definite relation to each other, which relation may be varied within certain limits, as stated hereinbefore, by shifting the coupling member 20. The movements of the funnel as well as those of the conveying worm are interrupted or started by disengagement or engagement respectively of the coupling 15.

The conveying worm 5 forces the mass forwards toward the one end of the drum 4, which is constructed in a special manner to form the forming device proper. The drum 4 is preferably divided so as to permit of ready dismounting for the purpose of cleaning the same.

The forming device

It is of importance that the blank rod forced out by the feeding device is entirely homogeneous and provided with entirely smooth surfaces. With respect to this circumstance it is preferable that the drum 4 as well as the conveying worm 5 are given a shape tapering toward the end of discharge, and that the worm does not extend as far as to the end of the drum, but terminates a certain distance inside the same. By the said tapering shape the pressure of the mass is increased, the mass being further compressed in the space formed between the end of the worm and the nozzle 21 proper. This space 22 thus forms a compression space which must be given a certain predetermined length, in order that the mass shall have time to be sufficiently compressed before it leaves the nozzle. The nozzle is of square cross section and tapers slightly toward its free end. In order to obviate uneven or scored portions on the blank rod forced out through the nozzle, the latter is preferably provided with an inner lining adapted to reduce the friction between the mass and the nozzle. To this end, the nozzle has a plate 23 inserted therein, which forms a certain kind of a mold, in which a layer 24 of paraffine or the like is provided. The nozzle is retained at the drum 4 by a bushing 25 or the like screwed onto the end thereof, so that the nozzle may be detached for cleaning.

The blank rod forced out through the nozzle is caused to slide forth in a path, along which the division of the same into blank pieces of the desired length is brought about by cutting the rod into pieces. It has been found that the cutting should not be effected in the immediate proximity of the nozzle, but only at a certain distance from the same, so that the blank rod will have time to expand prior to the cutting operation. The expansion depends on the fact that the pressure on the mass ceases when the blank rod leaves the nozzle. If the cutting is effected by means of a steel-wire, as is generally the case in dividing plastic masses, the surface of the cut would not be plane but more or less curved, if the cutting operation was effected before the blank rod had been permitted to expand. Owing to these circumstances the cutting means pertaining to the dividing mechanism is arranged, according to the present invention, at a certain distance from the nozzle. Practical experiments have given as a result that the said distance should be at least as great as the longest transversal edge of the blank rod.

To carry the blank rod, rollers 26 are employed, which, preferably, consist of a shaft covered by a cylindrical paraffine sleeve or the like, it having been found that the blank rod does not show the same tendency to stick to the paraffine as to rollers of other material. In addition to the horizontal rollers 26 there are provided vertical rollers 27 fitted with a cylindrical paraffine casing and adapted to form a lateral guide for the blank rod.

*The dividing mechanism*

The dividing mechanism comprises, first, a severing or cutting device adapted to cut off blank pieces of a predetermined length from the blank rod and, second, a conveying device adapted to convey blank pieces one at a time to the wrapping mechanism.

The cutting device (see particularly Figs. 1, 4 and 6–9) consists of a vertical disk 28 attached to an arm 29 carried by two arms 30 swingably mounted in the machine frame. Due to the manner in which the disk 28 is carried, the same is permitted to move in parallel to itself in the direction of movement of the blank rod. The magnitude of this movement is limited by abutments, as will be described more closely herein below. Provided in the disk 28, between the center and the circumference thereof, is a square opening 31 which is situated opposite to the blank rod and has such dimensions, and such a form and position, that the blank rod is permitted to pass unhampered through the same. The disk 28, which has a circular circumference, is surrounded by a ring 32 rotatably mounted on the same, the circumference of said ring being provided with a cord groove for a cord 33 extended round the ring and round a grooved pulley rigidly attached to a shaft 35, which is rotated through suitable transmission means from the motor 8 in a manner to be described more fully hereinbelow. Attached to the ring 32 is the one end of a steel-wire or a steel band 36, the other end of which is pivotally secured in the proximity of the center of the disk 28. When the ring 32 rotates, the steel band 36 will obviously move past the opening 31 thereby cutting off the blank rod passing therethrough. The blank rod, however, moves continuously, by reason of which the surface of the cut would obviously not be at right angles to the longitudinal direction of the rod, if the disk 28 were not caused during the cutting operation to move forwards at the same rate as the blank rod. The disk 28, therefore is movable, as before stated, and adapted to take part in the movement of the blank rod during the cutting operation, so that an entirely plane and perpendicular surface of cut is brought about. The method of causing the disk to partake in the movement and of returning the same will be described more fully in the following. The cord 33 extended about the ring 32 is driven continuously, but slides intermittently on the ring on account of the latter being periodically stopped. The object of periodically stopping the ring, is this, that the band 36 shall be caused to pass the opening 31 at predetermined time intervals, so that blank pieces of predetermined length are cut off. The stopping of the ring 32 is effected by an abutment 38 on the side of the ring facing the nozzle 21 being caused to hit a projection 65 situated in the path thereof. Said abutment and projection will be more fully described hereinbelow. The object of mounting the inner end of the steel band 36 eccentrically in relation to the center of the disk 28 is to keep the band stretched as much as possible while it is passing the opening 31. Obviously, the ring and the disk may be provided with more than one steel band, in which case means must be provided to stop the ring in several different positions.

The conveying means adapted to convey the cut off blank piece to the wrapping means consists of a carriage 39, which is provided with rollers 40 (see especially Figs. 7 and 9) adapted to run on tracks 41 provided on a casing 42 arranged above the blank rod and extending in the direction of said rod, said casing being carried by supports 43 secured in the frame of the machine. Journalled in the frame is a shaft 44 having attached thereon a sprocket wheel 45 provided within the casing 42, a chain 47 being extended about said sprocket wheel and about a second sprocket wheel 46 (Fig. 1) rotatably mounted in the casing. The chain 47 is connected, by means of a pin 48, with a projection 49 on the carriage 39, so that the latter is caused to move with the chain, when shaft 44 is caused to rotate. The direction of rotation of shaft 44 is reversed periodically, so that the carriage is caused to move to and fro between two end stations, one of which is a receiving station and the other a delivering station. The transmission means intended for the reversal of the direction of rotation of shaft 44 will be described more fully in connection with the description of the other transmission means of the machine.

The carriage is provided with gripping means in the form of two gripping plates 50 and 51 pivotally mounted in the carriage, said plates extending in the gripping position along the vertical longer sides of the blank piece, against which they are being pressed by a spring 52 actuating a projection 53 on the one gripping plate. The gripping plates are connected with each other by means of arms 54, so that they are caused positively to perform movements corresponding to each other.

When the carriage is moved toward the receiving station, the gripping plates are adjusted in the inoperative position, in which they are retained by a hook 55 engaging a recess in the projection 53 (see Fig. 8). The hook 55 is formed on a pawl 56, which is provided with a pin 57 located in the path of movement of an abutment 37 attached to the ring 32 (see Figs. 6 and 8.) When the carriage has reached the receiving station and a blank piece has been cut off, the abutment 37 of the ring 32 hits the pin 57 of the pawl 56, which results in that the engagement between the pawl 56 and the projection 53 is released. The spring 52 then forces the gripping plates 50 and 51 against the sides of the cut off blank piece, so that the latter is retained and carried by the carriage, when the latter is then moved toward the delivering place. At the delivering place the arms 54 meet an abutment 58 attached to the casing 42 (Fig. 1), which results in that the gripping plates are swung outwards and release the blank piece which is then delivered onto the table of the wrapping means. When the gripping plates swing outwards, the hook 55 of the pawl 56 will again engage the recess in the projection 53, so that the gripping plates are retained in the inoperative position until the carriage has been returned to the receiving station and another blank piece has been cut off and the pawl 56 has been released by reason of the abutment 37 hitting the pin 57.

When the carriage is moved into the receiving position, a resilient pawl 59 secured on the disk 28 hits a boss 60 secured on the gripping plate 50, said boss being adapted to be engaged by the pawl (Figs. 6–9). The disk 28 is thus coupled to the carriage 39 and will thus take part in the movement of the latter, as long as the coupling is intact. The carriage is provided with an abutment 61 located in the path of movement of the blank rod, said abutment being adapted to be adjusted at different distances from the end of the carriage by means of a screw 62. The end of the blank rod continuously advanced through the opening 31 in the disk 28 hits the abutment 61, which results in that the carriage is displaced thus carrying with it the disk 28. The disk then moves in a direction away from the nozzle, the abutment 38 on the side of the ring 32 being then withdrawn from the stationary projection 65 attached to the casing 42. The ring 32 is now rotated by the driving cord 33, which results in the cutting operation being commenced. During the whole of the cutting operation the disk 28 is carried forwards by the carriage 39 and moves forwards at the same rate as the blank rod, whereby the previously mentioned perpendicular surface of cut is obtained. As soon as the cutting operation is terminated, the pawl 56 is actuated by abutment 37, as described hereinbefore, and shifted so that the gripping plates are caused by the spring 52 to grip the cut off blank piece. Immediately on the gripping plates being swung inwardly, the boss 60 on the gripping plate 50 leaves the pawl 59, so that the disk 28 is automatically disengaged from the carriage 39, and the latter can continue its movement to the delivering station, whereas the disk 28 is returned to the starting position by a cam path 63 arranged on the ring 32, said cam path cooperating with an abutment 66 on the casing 42. A spring 64 provided between the arm 29 and the frame of the machine ensures said return movement. The above-mentioned projection 65 not only serves to stop the ring, when the abutment 38 hits the same, but also limits the return movement. Through adjustment of the abutment 61, the length of the cut off blank pieces may obviously be varied.

*The transmissions of motion*

The filling receptacle 1 and the conveying worm 5 receive their movements from the motor 8 in the manner previously described, a repetition of the description of the means involved being thus superfluous in this place. The motion to the other parts of the machine is mediated by a main shaft 200 journalled on the one side of the machine (see particularly Figs. 10–15), said main shaft having a belt pulley 201 secured thereon, a belt 203 being extended about the said pulley and over a second pulley 202 attached to the shaft of the motor 8. Provided on the shaft 200 is a coupling device 204 through the engagement or disengagement of which an extension 119 of the shaft may be engaged or disengaged. Attached to the shaft 119 is a belt pulley 205, a belt 207 being extended about said pulley and over a second pulley 206. The pulley 206 is secured on the previously mentioned shaft 35, to which a continuous rotary movement is thus imparted, said movement being transmitted by the cord pulley 34 and the cord 33 to the ring 32 in the manner set forth hereinbefore.

Moreover, the shaft 119 has the toothed wheel 118 rotatably mounted thereon (see also Figs. 13 and 14), said toothed wheel being in engagement with the gear wheel 109 secured on the shaft 115. The disk 116 attached to the shaft 115 actuates the combined suction and press pump 98. Moreover, there is attached to the shaft 115, a disk 208 having a slide slot provided therein for a slide 209 (Figs. 2 and 14), said slide being connected by means of a connecting rod 210 with a toothed rack 211 vertically guided in the frame of the machine, said rack being in engagement with a pinion 213 attached to a shaft 214 (see also Fig. 4). Attached to the shaft 214 is a toothed wheel 215 engaging a toothed wheel 216 secured on the previously mentioned shaft 44 (see also Figs. 6, 8 and 9). The toothed rack 211 is moved up and down and thus imparts to the shaft 44 rotary movements alternately in opposite directions, whereby the carriage 39 is moved to and fro. The slide 209 is provided with a pin, which is guided in a substantially circular cam slot 220 provided in a stationary disk 221. The cam slot 220 is provided with two recesses (Fig. 14), which bring about interruptions in the movements up and down of the connecting rod 210. The one of the pauses produced thereby occurs when the carriage 39 has reached the delivering station and when the package of yeast is to be delivered to the folding means. The other pause occurs when the carriage 39 has reached the receiving station. When the carriage has been moved onto the receiving station, the same must have a certain freedom of movement, however, which is permitted by the shaft 44 being provided with a coupling 217 adapted to be disconnected when the toothed rack 211 is in its highest position. In this position the toothed rack hits an arm 218 displaceably guided in the frame of the machine, said arm being displaced against the action of a spring 219 and disconnecting the coupling 217 (see Fig. 4). When the blank rod then actuates the abutment 61, the carriage and the disk 28 are brought forwards, as set forth hereinbefore, which results in the ring 32 being permitted to rotate and to perform the cutting operation, after which the abutment 37 actuates the pin 57, so that the gripping plates are released and seize the cut off blank piece.

The disk 208 is provided with a cam path 222 (Fig. 11) having a roller 223 bearing thereagainst, said roller being arranged on a sleeve 224 which is displaceably guided on a rod 225 which, in turn, is displaceably guided in the frame of the machine. Attached on the sleeve 224 is a fork 226 engaging a coupling member 227 displaceably arranged on the shaft 119, said coupling member being adapted periodically to be coupled to a second coupling member 228, the shaft of which is provided with a bevel gear 229 engaging a bevel gear 230 attached to the shaft 142. A spring 231 tends to keep the roller 223 bearing against the cam path 222, which during its rotation effects displacement of the sleeve 224, so that the couplings 227, 228 are engaged for each revolution of the disk 208. The bevel gear 230 and the shaft 142 will thus receive an intermittent rotary movement which is in a predetermined relation to the reciprocating movement of the carriage 39, so that a wrapping means (not shown) may be brought into operation at the proper moment and, on having returned to the starting position, remain for a certain time in this position.

In order that the transmissions of motion of the pump as well as of the carriage shall be disconnected at certain time intervals, the displaceable rod 225 is provided with a fork 235 (Figs. 11 and 12) enclosing a coupling member 232 displaceably but not rotatably arranged on the shaft 119, said coupling member 232 being adapted to be disengaged from and coupled to a coupling member 233 rotatably arranged on the shaft 119, the latter coupling member having the previously mentioned toothed wheel 118 secured thereon. An arm 234 attached to the one end of the rod 225 cooperates with a cam path arranged on one of the disks secured on the shaft 142 and thus brings about disconnection of the coupling member 232. The shape of the cam path actuating the arm 234 should obviously be adapted with respect to the shape of the cam path 222.

The coupling member 232 is engaged by the abutment 37 on the ring 32 hitting a rotatable arm (not shown in the drawings), which, in turn, displaces the rod 225.

Obviously, the machine operates altogether automatically and has a very great speed of production, while still performing the wrapping in an entirely efficient and reliable manner. If, nevertheless, disturbance would occur in operation, the various mechanisms may be conveniently disengaged. The perpendicular surfaces of the cuts are of importance with respect to the appearance of the wrapper and of the parcel. The compact construction of the machine involves that the space occupied by the same may be limited.

Finally, it should be observed that the machine and the various mechanisms, devices and detail constructions pertaining thereto, as hereinbefore described and illustrated in the drawings, are only to be regarded as examples illustrating the principle of the invention, the latter being of course not limited to said examples. It is pointed out that the transmissions of motion may be devised in a number of different ways.

We claim:

1. A machine for automatically forming and dividing plastic masses, comprising in combination means for feeding and forming a homogeneous blank rod, means for cutting off blank pieces of a predetermined length from said rod and adapted to take part in the continuous movement of the latter so that the cutting off will take place during the movement of the rod, a reciprocating carriage adapted to automatically seize, move and deliver said blank pieces to a wrapping place, means for automatically and periodically coupling the cutting off means to and releasing the same from the carriage, so that the same takes part in the movement of the latter over a predetermined distance, and means for periodically rotating said cutting off means when coupled to the carriage, so that the cutting off means is caused to move through the blank rod during the continuous movement of the same for cutting off blank pieces having cutting surfaces at right angles to the longitudinal direction of the rod.

2. A machine according to claim 1 wherein the cutting off means includes a plate-like member having an opening through which the blank rod passes, a member mounted for rotation on the plate-like member, and a flexible metal cutting element connected to the rotary member and traversing the opening and connected to the plate near the center thereof.

3. A machine according to claim 1 wherein the cutting off means includes a disk member having an opening through which the blank rod passes, an annular rotary member on the periphery of the disk member and a cutting band one end of which is attached to the annular member while the other end is connected eccentrically near the center of the disk so that the cutting member is normally slack but is stretched during the severing operation.

4. A machine according to claim 1 wherein means is provided for reciprocating the carriage from a receiving to a delivering position, swingable gripping members operably mounted on the carriage, means to swing the members into operative position at the completion of the cutting operation and to press the members against opposite sides of the blank piece, so that the cut piece will be conveyed with the carriage as the latter is moved to a delivering position, and a releasing device arranged in the path of movement of the carriage for releasing the gripping members when the carriage reaches the delivering position.

5. A machine according to claim 1 wherein spring controlled gripping members are pivotally mounted on opposite sides of the carriage for seizing the cut off piece of the blank rod, means for releasing the gripping members when the carriage reaches a delivery position, a locking member on the carriage for automatically engaging the members when the latter have been released and during the return of the carriage to a receiving position, and a member on the cutting-off means for automatically releasing the locking means at the completion of the cutting operation.

6. A machine according to claim 1, wherein the means for automatically and periodically coupling the cutting-off means to and releasing the same from the carriage includes spring-controlled gripping members pivotally mounted on opposite sides of the carriage and operably connected together, means for releasably holding the member in inactive position, a boss on one of said members, a resilient pawl on the cutting-off means for engaging the boss when the members are in an inactive position, and means on the cutting-off means for releasing the holding means at the completion of the cutting action to allow the grippers to move under their spring action into an engaging position and simultaneously cause the boss to move out of engagement with the pawl.

7. A machine according to claim 1 wherein the means for automatically and periodically coupling the cutting-off means to and releasing the same from the carriage also includes coactive means on the machine frame and cutting-off means for releasably holding the cutting-off means inactive, an abutment on the carriage and in the path of movement of the blank rod so as to be struck by the rod to effect initial movement of the carriage, as well as the release of the cutting-off means from the holding means so that the cutting-off means will perform its cutting operation, spring-controlled gripping members on the carriage, means on the cutting-off means for effecting operation of the gripping members at the completion of the cutting operation, and cooperative engaging means on the gripping members and the cutting-off means for releasing the latter from the carriage upon the operation of the gripping members.

8. A machine for automatically forming and dividing plastic masses, including in combination, a forming die, means for forcing the mass through the die, cutting means arranged in the path of movement of the formed mass, operating means for the cutting means, means for releasably holding the cutting means inactive, a reciprocating carriage, gripping means on the carriage, means on the carriage for releasably holding the gripping means in an inactive position, means for detachably coupling the cutting means to the gripping means when the latter are in an inactive position, means on the carriage actuated by movement of the formed mass to impart initial movement to the carriage and to release the cutting means to permit of operation of the latter, and means on the cutting means to release the gripping means at the completion of the cutting operation and to thereby uncouple the cutting means from the carriage.

9. A machine as claimed in claim 8 wherein spring means is provided for returning the cutting means to its original position subsequent to the release of said means from the carriage.

10. A machine as claimed in claim 8 wherein an abutment is mounted in the path of movement of the carriage for releasing the gripping means from the piece being carried and for moving the gripping means into engagement with the means for releasably holding the gripping means in an inactive position.

11. In a machine for forming and cutting a plastic mass, a forming die, means for forcing the mass through said die, a cutting band, a circular support for said band, one end of said band being pivotally secured to said support, an annular member rotatably mounted on said support, the other end of said band being secured to said member, means for rotating said member with respect to said support, a stop arm for engaging said member to prevent rotation thereof, and means actuated by said mass for disengaging said member from said arm to permit rotation thereof and for moving said support axially with respect to said die.

12. In a machine for forming and cutting a plastic mass, a forming die, means for forcing the mass through said die, a cutting band, a circular support for said band, one end of said band being pivotally secured to said support, an annular member rotatably mounted on said support, the other end of said band being secured to said member, means for rotating said member with respect to said support, a stop arm for engaging said member to prevent rotation thereof, an abutment disposed in the path of said mass and movable therewith, a pivoted plate secured to said abutment, means on said support for engaging said plate, means actuated by said mass for disengaging said member from said arm to permit rotation thereof, and means on said support for releasing said plate engaging means after a predetermined rotation of said support.

In testimony whereof we have hereunto affixed our signatures.

HERBERT AUGUST LEONARD SWÄRD.
ANTON GUSTAF HILDORIUS SWÄRD.